United States Patent
Nakajima (10) Patent No.: US 11,755,378 B2
(45) Date of Patent: Sep. 12, 2023

(54) TENANT MANAGEMENT SYSTEM CAPABLE OF OPERATING TENANT SPECIFIC APPLICATIONS APPROPRIATELY

(71) Applicant: KYOCERA Document Solutions Inc., Osaka (JP)

(72) Inventor: Koki Nakajima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/656,530

(22) Filed: Mar. 25, 2022

(65) Prior Publication Data

US 2022/0342716 A1    Oct. 27, 2022

(30) Foreign Application Priority Data

Apr. 27, 2021   (JP) .................................. 2021-074657

(51) Int. Cl.
*G06F 9/50* (2006.01)
(52) U.S. Cl.
CPC .......... *G06F 9/5072* (2013.01); *G06F 9/5077* (2013.01)
(58) Field of Classification Search
CPC ............................. G06F 9/5072; G06F 9/5077
See application file for complete search history.

(56) References Cited

U.S. PATENT DOCUMENTS

| | | | |
|---|---|---|---|
| 11,194,671 B2 | 12/2021 | Shiihara | |
| 11,307,885 B1* | 4/2022 | Luciano | ................ G06F 9/5088 |
| 2018/0351958 A1* | 12/2018 | Sakurai | ................ H04L 63/102 |
| 2018/0359238 A1* | 12/2018 | Appiah | ............... H04L 63/0853 |
| 2019/0356543 A1* | 11/2019 | Chen | ..................... G06F 9/5011 |

FOREIGN PATENT DOCUMENTS

JP         2019139591 A        8/2019

* cited by examiner

*Primary Examiner* — Nicholas P Celani
(74) *Attorney, Agent, or Firm* — Alleman Hall Creasman & Tuttle LLP (57) ABSTRACT

A tenant management system includes an application management portion and a server resource management portion. The application management portion terminates a request from a user at a tenant specific application that is an application prepared for a tenant in a solution built on a public cloud. The server resource management portion provisions resource of a web server that realizes the tenant specific application. When a value that is obtained by multiplying a number of users who are registered in association with a particular tenant specific application for a particular tenant, by an amount of resource that is assumed to be consumed when one user uses the particular tenant specific application, has exceeded a current amount of resource of the particular tenant specific application for the particular tenant, the server resource management portion additionally provisions a particular amount of resource of the particular tenant specific application for the particular tenant.

2 Claims, 11 Drawing Sheets

| No. | ADDRESS | SURNAME | NAME | MAIL ADDRESS | APID | SUBDOMAIN | USERID | PASSWORD |
|---|---|---|---|---|---|---|---|---|
| 1 | xxStreet, Tamatsukuri, Osakashi Chuo ku, Osaka | Test | Man | a@b.com | APL1 | dc | Hoge | Hoge |
| 2 | yyStreet, Minatomirai, Yokohamashi Nishiku, Kanagawa | Test1 | Man1 | b@c.com | APL2 | test | Hoge1 | Hoge2 |
| * * * | * * * | * * * | * * * | * * * | * * * | * * * | * * * | * * * |

| No. | AP NAME | APID | CONSUMPTION RESOURCE UNIT | REQUIRED CONSUMPTION RESOURCE |
|---|---|---|---|---|
| 1 | Appl1 | APL1 | 30 | 300 |
| 2 | Appli2 | APL2 | 40 | 480 |
| . | . | . | . | . |
| . | . | . | . | . |
| . | . | . | . | . |

TENANT MANAGEMENT SYSTEM CAPABLE OF OPERATING TENANT SPECIFIC APPLICATIONS APPROPRIATELY

INCORPORATION BY REFERENCE

This application is based upon and claims the benefit of priority from the corresponding Japanese Patent Application No. 2021-074657 filed on Apr. 27, 2021, the entire contents of which are incorporated herein by reference.

BACKGROUND

The present disclosure relates to a tenant management system for managing tenants in a solution built on a public cloud.

Conventionally, there is known a tenant management system of multitenant model for dividing the environment and data for each client based on identification information of each tenant.

SUMMARY

A tenant management system according to an aspect of the present disclosure includes an application management portion and a server resource management portion. The application management portion terminates a request from a user at a tenant specific application that is an application prepared for a tenant in a solution that is built on a public cloud. The server resource management portion provisions resource of a web server that realizes the tenant specific application. When a value that is obtained by multiplying a number of users who are registered in association with a particular tenant specific application for a particular tenant, by an amount of resource that is assumed to be consumed when one user uses the particular tenant specific application, has exceeded a current amount of resource of the particular tenant specific application for the particular tenant, the server resource management portion additionally provisions a particular amount of resource of the particular tenant specific application for the particular tenant.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings.

First, a configuration of a tenant management system according to the embodiment of the present disclosure is described.

Figure 1:
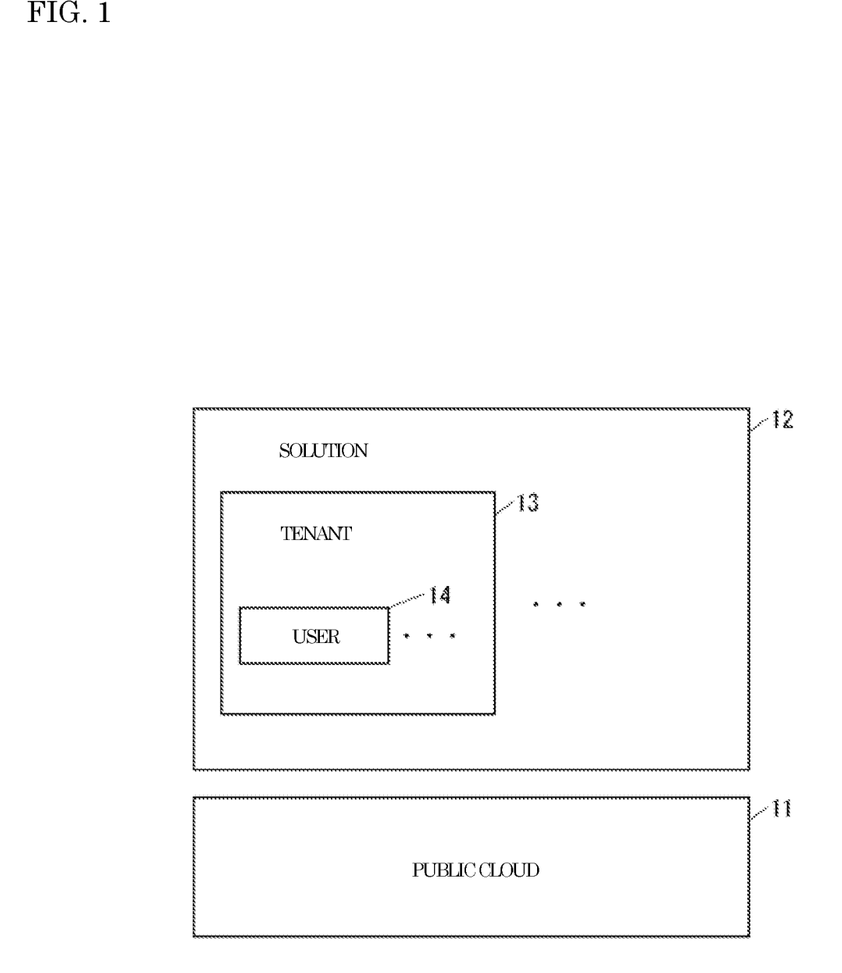
FIG. 1 is a diagram for explanation of tenants who are managed by a tenant management system according to an embodiment of the present disclosure.

FIG. 1 is a diagram for explanation of tenants who are managed by the tenant management system according to the present embodiment.

As shown in FIG. 1, a solution 12 is built on a public cloud 11. Here, for example, a document management solution for managing documents is adopted as the solution 12.

The provider of the solution 12 can lease at least a part of the solution 12 to others. A unit to which the provider of the solution 12 leases at least a part of the solution 12 is referred to as a tenant. There is a plurality of tenants, including a tenant 13, in the solution 12.

There is a plurality of users, including a user 14, in the tenant 13. The tenants other than the tenant 13 have the same configuration as the tenant 13.

Figure 2:
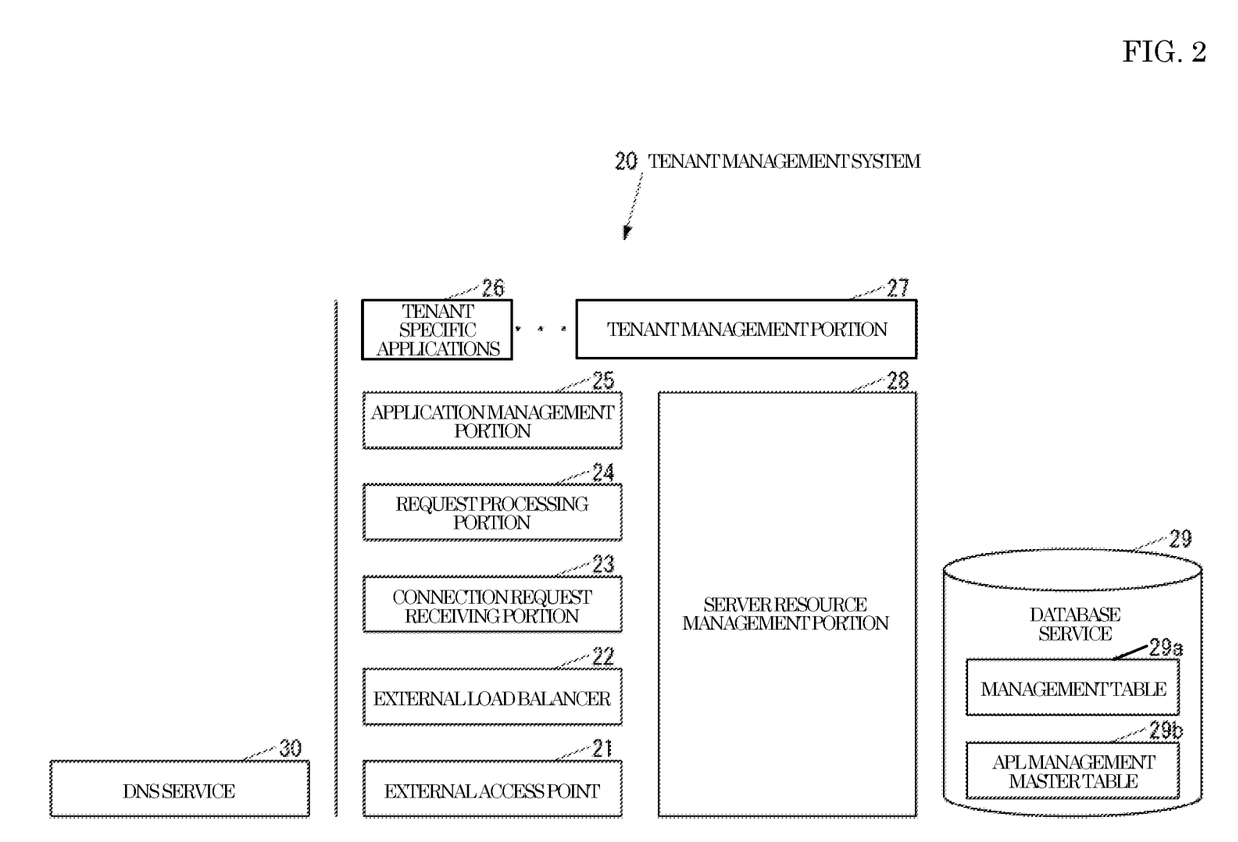
FIG. 2 is a block diagram showing a software configuration of the tenant management system according to the embodiment of the present disclosure.

FIG. 2 is a block diagram showing a software configuration of a tenant management system 20 according to the present embodiment.

As shown in FIG. 2, the tenant management system 20 includes, in the public cloud 11 (see FIG. 1), an external access point 21, an external load balancer 22, a connection request receiving portion 23, a request processing portion 24, an application management portion 25, tenant specific applications 26, a tenant management portion 27, a server resource management portion 28, a database service 29, and a DNS (Domain Name System) service 30, wherein the external access point 21 is an accessible end point that is disclosed outside the public cloud 11, such as outside a data center, the external load balancer 22 is configured to retain a connection, such as an HTTP (Hypertext Transfer Protocol)/HTTPS (Hypertext Transfer Protocol Secure) connection, from outside, and realize a function to decentralize a load to a web server that is described below, the connection request receiving portion 23 is configured to receive a connection request from the external load balancer 22, the request processing portion 24 is configured to process an external request including an authentication, the application management portion 25 is configured to terminate a request from a user at a tenant specific application that is described below, the tenant specific applications 26 are applications that are each prepared for one of the tenants, the tenant management portion 27 is configured to manage various types of information of the tenants, the server resource management portion 28 is configured to, when the resource of the web server is insufficient, provision a new cloud resource, the database service 29 stores data tables that are required to manage the tenants, and the DNS service 30 is configured to register the FQDN (Fully Qualified Domain Name) of the external access point 21. The tenant management system 20 is provided with at least one tenant specific application other than the tenant specific applications 26.

A plurality of tenant specific applications may be prepared for one tenant. Any of various types of applications, such as a document management application, a schedule book application, and a chat tool, may be adopted as the tenant specific applications.

The database service 29 stores a management table 29a and an APL management master table 29b as the data tables that are required to manage the tenants, wherein the management table 29a is used to manage the tenants, and the APL management master table 29b is used to manage the tenant specific applications.

Figure 3:
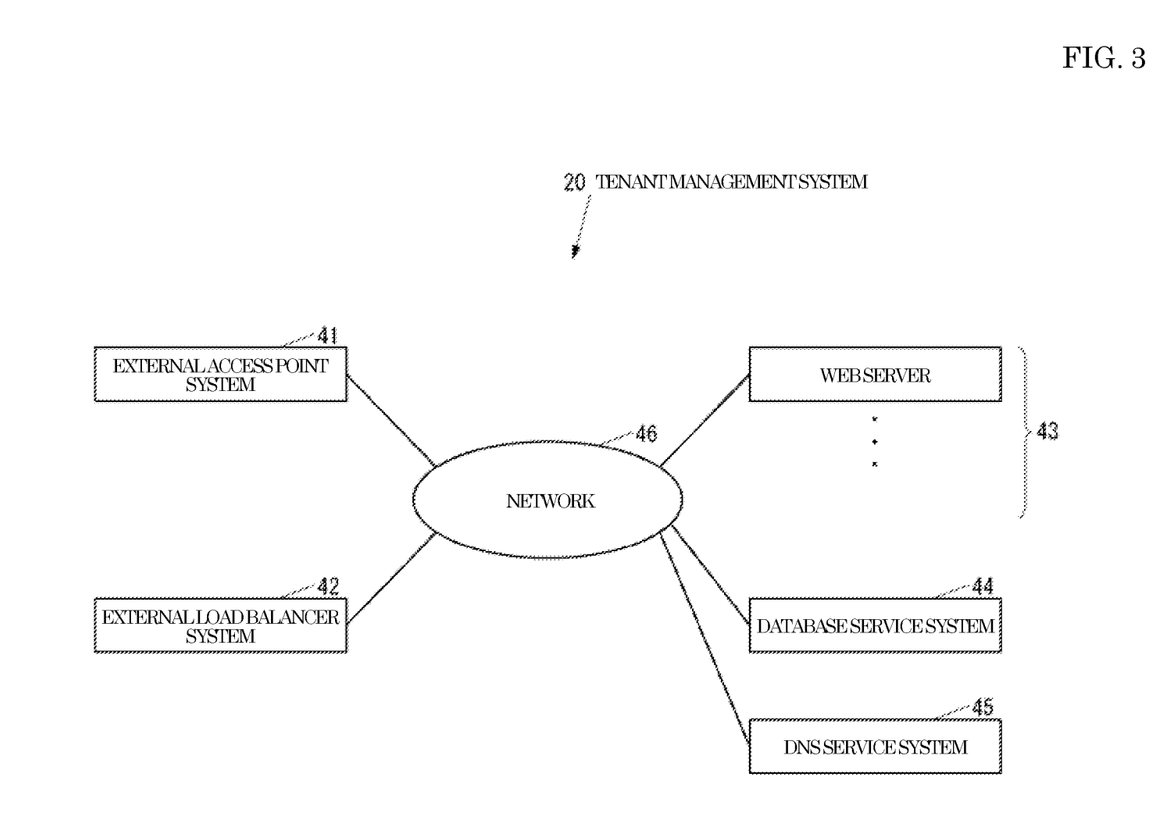
FIG. 3 is a block diagram showing a hardware configuration of the tenant management system shown in FIG. 2.

FIG. 3 is a block diagram showing a hardware configuration of the tenant management system 20.

As shown in FIG. 3, the tenant management system 20 includes: an external access point system 41 for realizing the external access point 21; an external load balancer system 42 for realizing the external load balancer 22; a web server group 43; a database service system 44 for realizing the database service 29; and a DNS service system 45 for realizing the DNS service 30. The external access point system 41, the external load balancer system 42, the web server, the database service system 44, and the DNS service system 45 are configured to communicate with each other via a network 46 that is, for example, the Internet.

Each of the external access point system 41, the external load balancer system 42, the database service system 44, and the DNS service system 45 is realized by at least one computer.

The web server group 43 realizes the connection request receiving portion 23, the request processing portion 24, the application management portion 25, the tenant specific applications 26, the tenant management portion 27, and the server resource management portion 28. At least one of the connection request receiving portion 23, the request processing portion 24, the application management portion 25, the tenant specific applications 26, the tenant management portion 27, and the server resource management portion 28 may be realized by only one web server, or may be realized by a plurality of web servers. At least one web server of the web server group 43 may realize at least two of the connection request receiving portion 23, the request processing portion 24, the application management portion 25, the tenant specific applications 26, the tenant management portion 27, and the server resource management portion 28.

Figure 4:
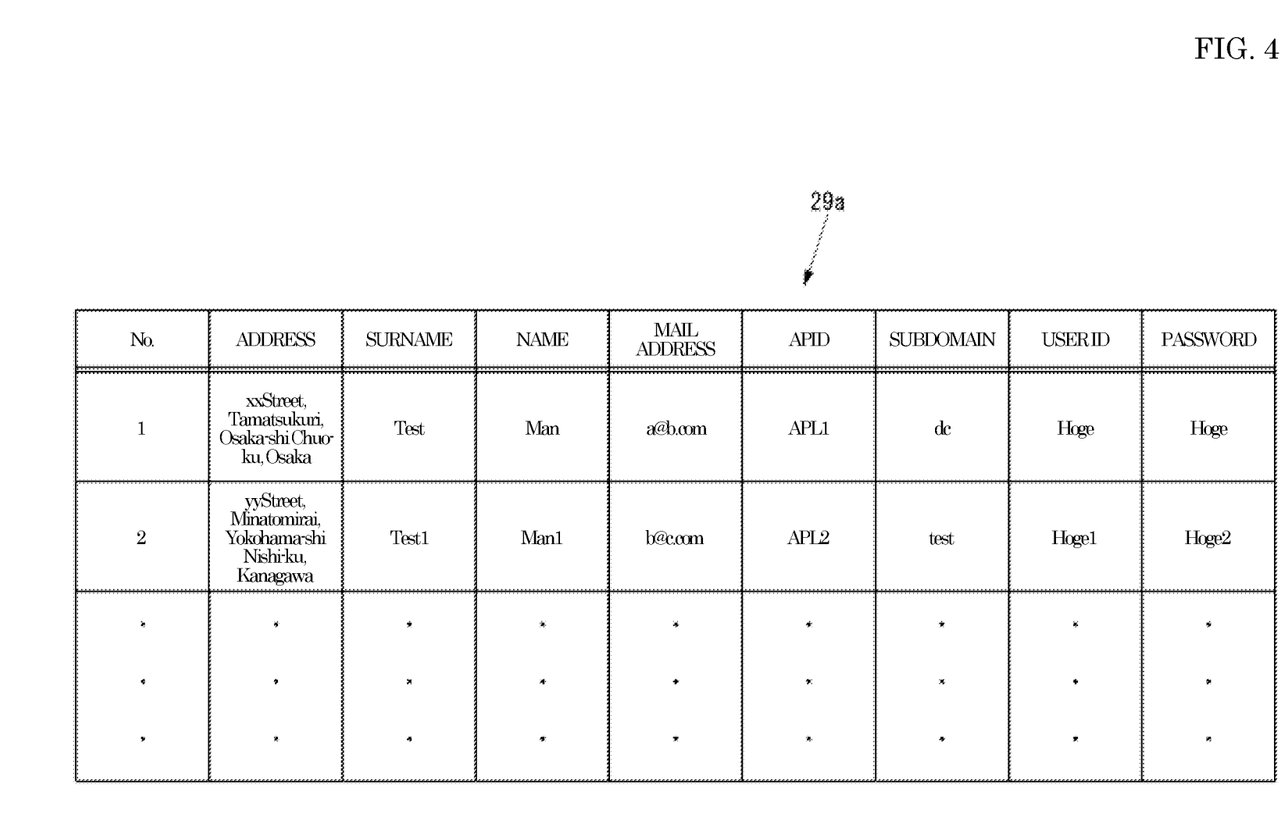
FIG. 4 is a diagram showing an example of a management table shown in FIG. 2.

FIG. 4 is a diagram showing an example of the management table 29a.

The management table 29a shown in FIG. 4 stores a plurality of combinations of a user's address, a user's surname, a user's name, a user's mail address, an APID as identification information of a tenant specific application, a subdomain as identification information of a tenant, a user ID as identification information of a user, and a user's password.

Figure 5:
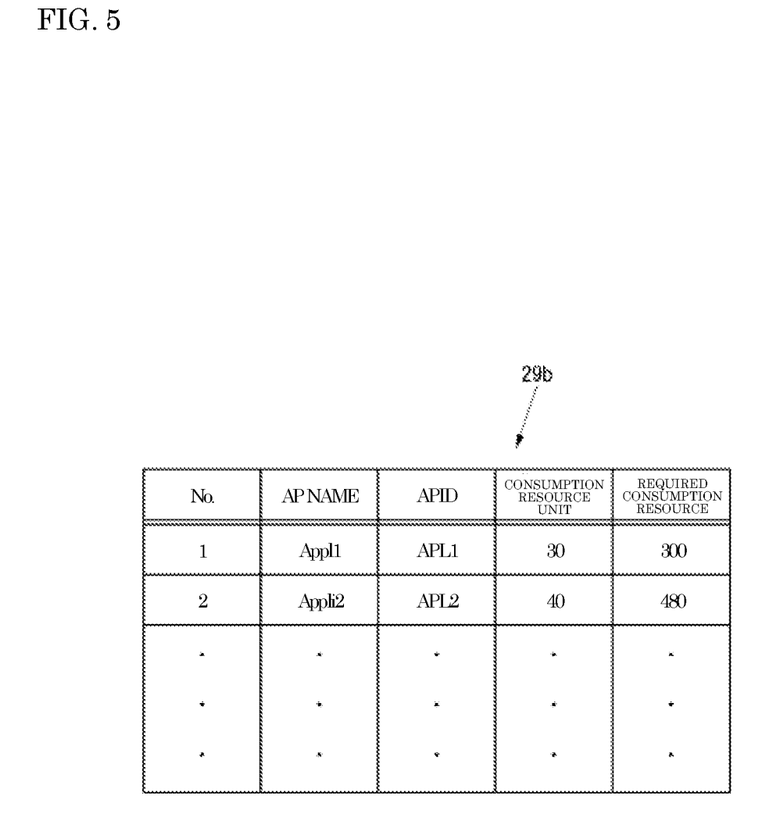
FIG. 5 is a diagram showing an example of an APL management master table shown in FIG. 2.

FIG. 5 is a diagram showing an example of the APL management master table 29b.

The APL management master table 29b shown in FIG. 5 stores, for each tenant specific application, a combination of an AP name, an APID, a consumption resource unit, and a required consumption resource, wherein the AP name is a name of a tenant specific application, the consumption resource unit indicates an amount of resource that is assumed to be consumed when one user uses the tenant specific application, and the required consumption resource indicates the upper limit of the amount of resource that assures a same tenant specific application to be used simultaneously.

Figure 6:
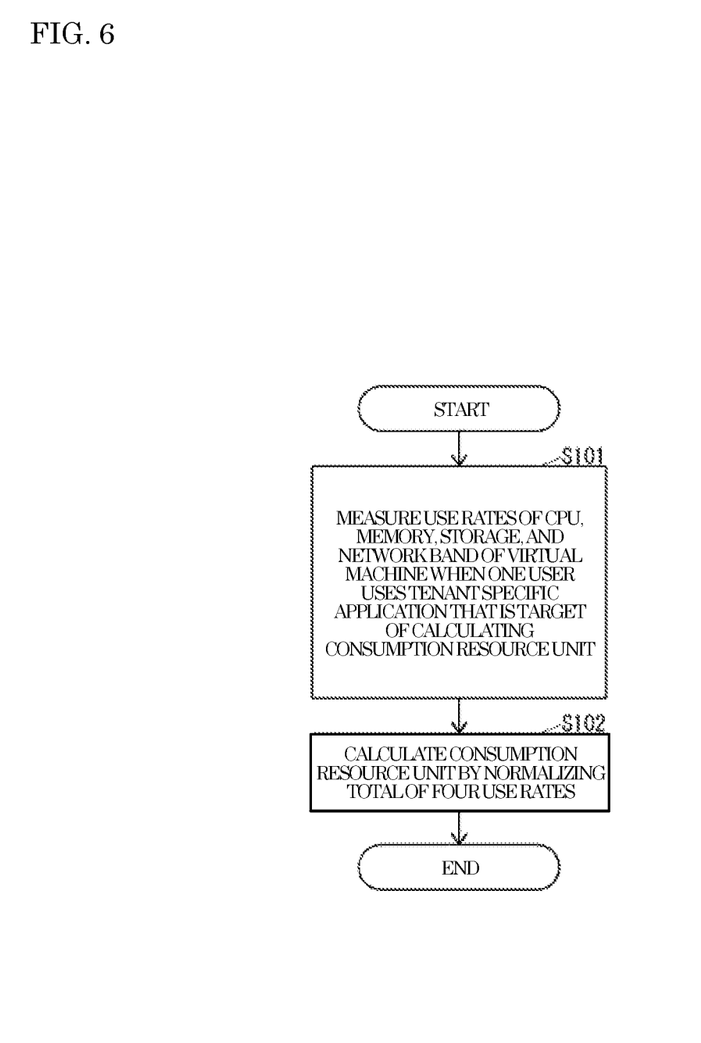
FIG. 6 is a flowchart showing an example of a method for calculating a consumption resource unit shown in FIG. 5.

The consumption resource unit may be calculated as shown in FIG. 6 when, for example, the resource of a web server that realizes a tenant specific application is composed of a CPU, a memory, a storage, and a network band of a virtual machine that realizes the tenant specific application.

FIG. 6 is a flowchart showing an example of a method for calculating the consumption resource unit shown in FIG. 5.

As shown in FIG. 6, the use rates of the CPU, the memory, the storage, and the network band of the virtual machine are measured when one user uses a tenant specific application that is a target of calculating the consumption resource unit (S101).

Subsequently, the consumption resource unit is calculated by normalizing the total of the four use rates measured in S101, with maximum 100 and minimum 0 based on the following formula in Math 1 (S102).

$$Y = \left\lceil \frac{X}{4} \right\rceil \quad \text{[Math 1]}$$

In the above formula in Math 1, X denotes the total of the four use rates measured in S101, and Y denotes the consumption resource unit, wherein the consumption resource unit is obtained by first dividing X by 4 and then rounding up the part below a decimal point of the result of the division.

For example, when the use rates of the CPU, the memory, the storage, and the network band of the virtual machine measured when one user uses a tenant specific application that is a target of calculating the consumption resource unit, are 40%, 50%, 30%, and 50%, respectively, the total of the use rates is 170%, and thus the consumption resource unit is 43%.

The required consumption resource may be calculated by, for example, multiplying the number of users who are assured to use a target tenant specific application simultaneously, by the consumption resource unit of the tenant specific application.

Next, operations of the tenant management system 20 is described.

First, an operation of the tenant management system 20 to register a tenant is described.

Figure 7:
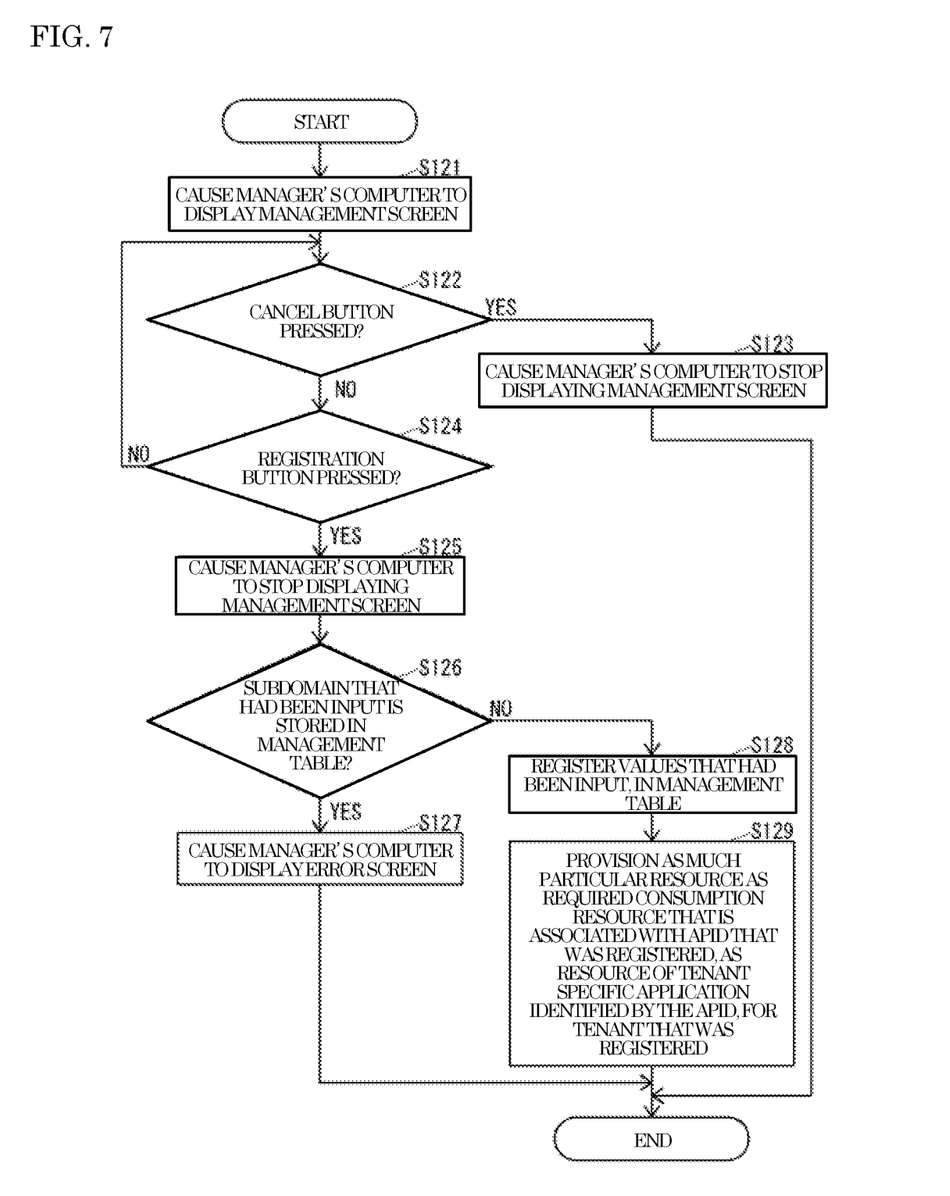
FIG. 7 is a flowchart showing an operation of the tenant management system shown in FIG. 2 to register a tenant.

FIG. 7 is a flowchart showing the operation of the tenant management system 20 to register a tenant.

A manager of the tenant management system 20 transmits an instruction to start registration of a tenant to the tenant management portion 27 via a computer (not shown: hereinafter referred to as a "manager's computer") when the manager desires to register a new tenant. The manager's computer is realized by a computer such as a PC (Personal Computer). Upon receiving the instruction to start registration of a tenant, the tenant management portion 27 starts the operation shown in FIG. 7.

As shown in FIG. 7, the tenant management portion 27 causes the manager's computer to display a management screen 60 (see FIG. 8) for registration of a tenant, by transmitting data for displaying the management screen 60 to the manager's computer (S121). Upon receiving the data for displaying the management screen 60, the manager's computer displays the management screen 60 that corresponds to the received data, on a display portion (not shown) of the manager's computer itself. This allows the manager to confirm the management screen 60 displayed on the display portion of the manager's computer, and operate the management screen 60 via an operation portion (not shown) of the manager's computer.

Figure 8:
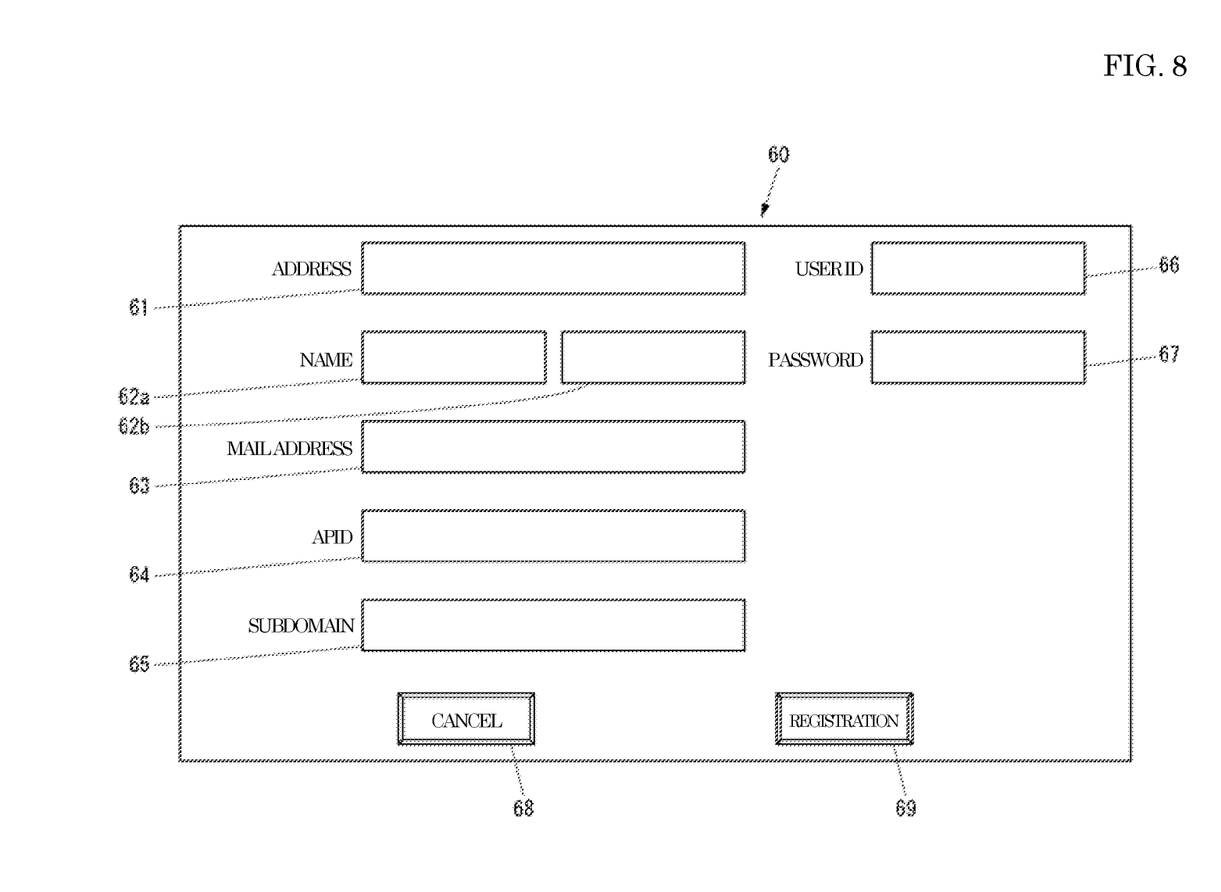
FIG. 8 is a diagram showing an example of a management screen displayed on a display portion of a manager's computer in the operation shown in FIG. 7.

FIG. 8 is a diagram showing an example of the management screen 60 displayed on the display portion of the manager's computer.

As shown in FIG. 8, the management screen 60 includes a text box 61, a text box 62*a*, a text box 62*b*, a text box 63, a text box 64, a text box 65, a text box 66, a text box 67, a cancel button 68, and a registration button 69, wherein a user's address is input in the text box 61, a user's surname is input in the text box 62*a*, a user's name is input in the text box 62*b*, a user's mail address is input in the text box 63, an APID is input in the text box 64, a subdomain is input in the text box 65, a user ID is input in the text box 66, a user's password is input in the text box 67, the cancel button 68 is used to cancel the registration of the tenant, and the registration button 69 is used to register the tenant.

The manager inputs values in the text boxes 61, 62*a*, 62*b*, 63, 64, 65, 66, and 67 via the operation portion of the manager's computer. It is noted that any one of the APIDs that are stored in the APL management master table 29*b*, can be input in the text box 64.

The manager presses the cancel button 68 and the registration button 69 via the operation portion of the manager's computer.

As shown in FIG. 7, after the process of S121, the tenant management portion 27 determines whether or not the cancel button 68 has been pressed (S122).

Upon determining in S122 that the cancel button 68 has been pressed, the tenant management portion 27 causes the manager's computer to stop displaying the management screen 60 (S123), and ends the operation shown in FIG. 7.

Upon determining in S122 that the cancel button 68 has not been pressed, the tenant management portion 27 determines whether or not the registration button 69 has been pressed (S124).

Upon determining in S124 that the registration button 69 has not been pressed, the tenant management portion 27 executes the process of S122.

Upon determining in S124 that the registration button 69 has been pressed, the tenant management portion 27 causes the manager's computer to stop displaying the management screen 60 (S125).

Subsequently, the tenant management portion 27 determines whether or not a subdomain that had been input in the text box 65 when the registration button 69 was pressed, is stored in the management table 29*a* (S126).

Upon determining in S126 that the subdomain that had been input in the text box 65 when the registration button 69 was pressed, is stored in the management table 29*a*, the tenant management portion 27 causes the manager's computer to display an error screen (not shown) by transmitting data for displaying the error screen to the manager's computer (S127), and ends the operation shown in FIG. 7. Upon receiving the data for displaying the error screen, the manager's computer displays the error screen that corresponds to the received data, on the display portion of the manager's computer itself. This allows the manager to confirm the error screen displayed on the display portion of the manager's computer.

Upon determining in S126 that the subdomain that had been input in the text box 65 when the registration button 69 was pressed, is not stored in the management table 29*a*, the tenant management portion 27 registers values that had been input on the management screen 60 when the registration button 69 was pressed, in the management table 29*a* (S128). That is, the tenant management portion 27 registers, in the management table 29*a*, a combination of an address that had been input in the text box 61 when the registration button 69 was pressed, a surname that had been input in the text box 62*a* when the registration button 69 was pressed, a name that had been input in the text box 62*b* when the registration button 69 was pressed, a mail address that had been input in the text box 63 when the registration button 69 was pressed, an APID that had been input in the text box 64 when the registration button 69 was pressed, a subdomain that had been input in the text box 65 when the registration button 69 was pressed, a user ID that had been input in the text box 66 when the registration button 69 was pressed, and a password that had been input in the text box 67 when the registration button 69 was pressed.

After the process of S128, the server resource management portion 28 provisions, in the APL management master table 29*b*, as much particular resource as the required consumption resource that is associated with an APID that was registered in the management table 29*a* in S128, as resource of a tenant specific application identified by the APID, for a tenant that was registered in the management table 29*a* in S128 (S129). It is noted that types of resource to be provisioned and an amount of each of the types of resource are preliminarily determined for each of the tenant specific applications.

After the process of S129, the server resource management portion 28 ends the operation shown in FIG. 7.

Next, an operation of the tenant management system 20 to newly register a tenant specific application for a tenant is described.

Figure 9:
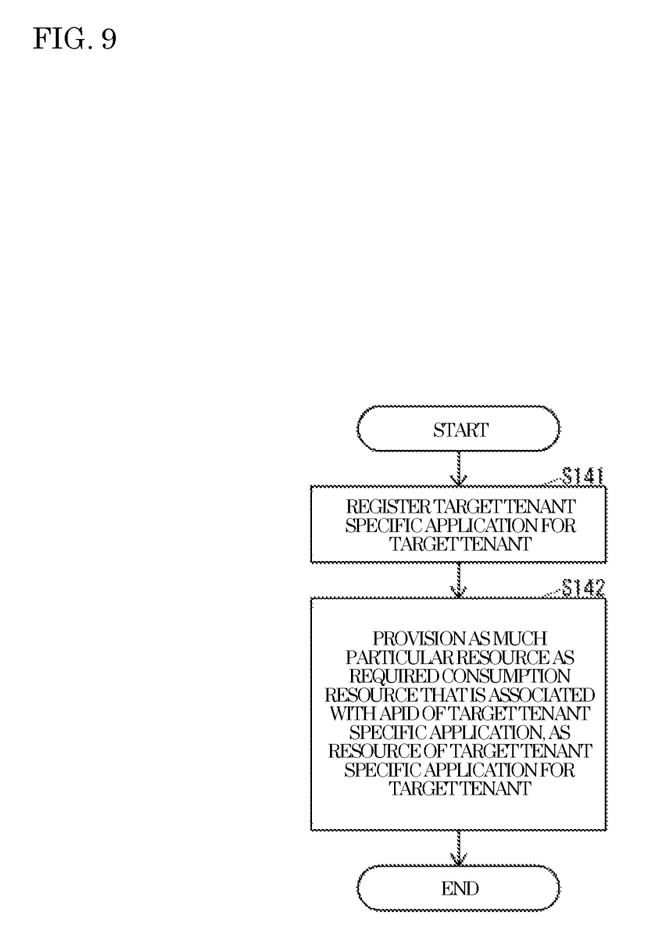
FIG. 9 is a flowchart showing an operation of the tenant management system shown in FIG. 2 to newly register a tenant specific application for a tenant.

FIG. 9 is a flowchart showing the operation of the tenant management system 20 to newly register a tenant specific application for a tenant.

When the manager desires to newly register a particular tenant specific application (hereinafter, referred to as a "target tenant specific application" in the description of the operation shown in FIG. 9) for a particular tenant (hereinafter, referred to as a "target tenant" in the description of the operation shown in FIG. 9), the manager transmits, to the tenant management portion 27 via the manager's computer, an instruction to start new registration of the target tenant specific application for the target tenant. Here, when the target tenant specific application for the target tenant is newly registered, an address, a surname, a name, a mail address, a user ID, and a password of a user of the target tenant specific application for the target tenant are specified, too. Upon receiving the instruction to start new registration of the target tenant specific application for the target tenant, the tenant management portion 27 starts the operation shown in FIG. 9.

As shown in FIG. 9, the tenant management portion 27 newly registers the target tenant specific application for the target tenant in the management table 29*a* by executing a particular operation (S141). Here, the tenant management portion 27 registers, in the management table 29*a*, a combination of: an APID of the target tenant specific application; the address, the surname, the name, the mail address, the user ID, and the password of a specified user; and a subdomain of the target tenant.

After the process of S141, the server resource management portion 28 provisions, in the APL management master table 29b, as much particular resource as the required consumption resource that is associated with the APID of the target tenant specific application, as resource of the target tenant specific application for the target tenant (S142). It is noted that types of resource to be provisioned and an amount of each of the types of resource are preliminarily determined for each of the tenant specific applications.

After the process of S142, the server resource management portion 28 ends the operation shown in FIG. 9.

Next, an operation of the tenant management system 20 to newly register a user for a particular tenant specific application for a tenant is described.

Figure 10:
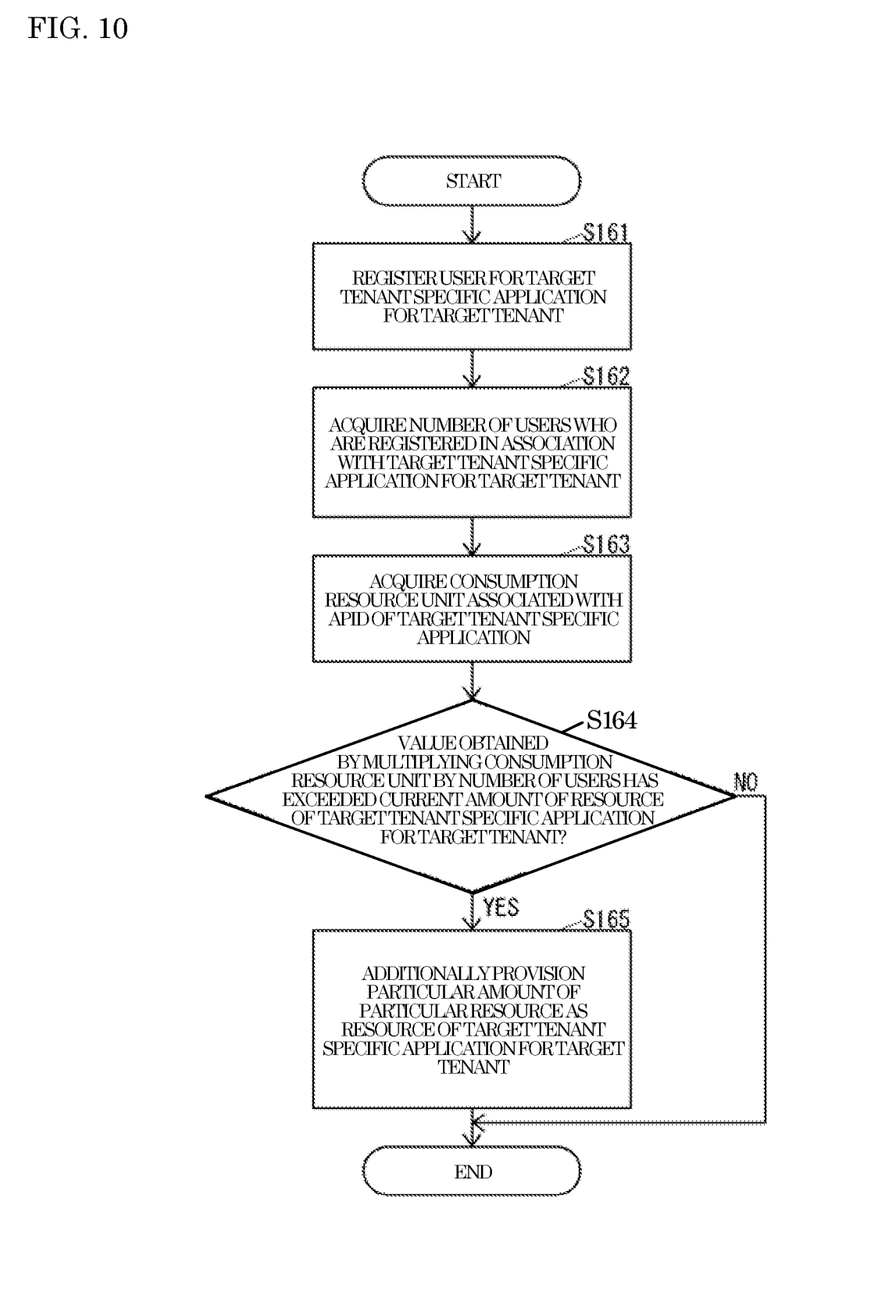
FIG. 10 is a flowchart showing an operation of the tenant management system shown in FIG. 2 to newly register a user for a particular tenant specific application for a tenant.

FIG. 10 is a flowchart showing the operation of the tenant management system 20 to newly register a user for a particular tenant specific application for a tenant.

When the manager desires to newly register a user for a particular tenant specific application (hereinafter, referred to as a "target tenant specific application" in the description of the operation shown in FIG. 10) for a particular tenant (hereinafter, referred to as a "target tenant" in the description of the operation shown in FIG. 10), the manager transmits, to the tenant management portion 27 via the manager's computer, an instruction to start new registration of the user for the target tenant specific application for the target tenant. Upon receiving the instruction to start new registration of the user for the target tenant specific application for the target tenant, the tenant management portion 27 starts the operation shown in FIG. 10.

As shown in FIG. 10, the tenant management portion 27 newly registers a user who was specified by the manager, in the management table 29a by executing a particular operation (S161). Here, the tenant management portion 27 registers, in the management table 29a, a combination of: an address, a surname, a name, a mail address, a user ID, and a password of the new user; a subdomain of the target tenant; and an APID of the target tenant specific application.

After the process of S161, the server resource management portion 28 acquires the number of users who are registered in the management table 29a in association with the target tenant specific application for the target tenant (S162).

Subsequently, the server resource management portion 28 acquires, from the APL management master table 29b, a consumption resource unit associated with the APID of the target tenant specific application (S163).

Subsequently, the server resource management portion 28 determines whether or not a value obtained by multiplying the consumption resource unit acquired in S163 by the number of users acquired in S162 has exceeded a current amount of resource of the target tenant specific application for the target tenant (S164).

Upon determining in S164 that the value obtained by multiplying the consumption resource unit acquired in S163 by the number of users acquired in S162 has exceeded the current amount of resource of the target tenant specific application for the target tenant, the server resource management portion 28 additionally provisions a particular amount of particular resource as resource of the target tenant specific application for the target tenant (S165). It is noted that the amount of resource to be provisioned may be, for example, an amount that is obtained by subtracting the current amount of resource of the target tenant specific application for the target tenant from the value obtained by multiplying the consumption resource unit acquired in S163 by the number of users acquired in S162. In addition, the types of resource to be provisioned and an amount of each of the types of resource may be preliminarily determined for each of the tenant specific applications.

Upon determining in S164 that the value obtained by multiplying the consumption resource unit acquired in S163 by the number of users acquired in S162 has not exceeded the current amount of resource of the target tenant specific application for the target tenant, or upon completion of the process of S165, the server resource management portion 28 ends the operation shown in FIG. 10.

Next, an operation of the tenant management system 20 when a user uses a tenant specific application is described.

Figure 11:
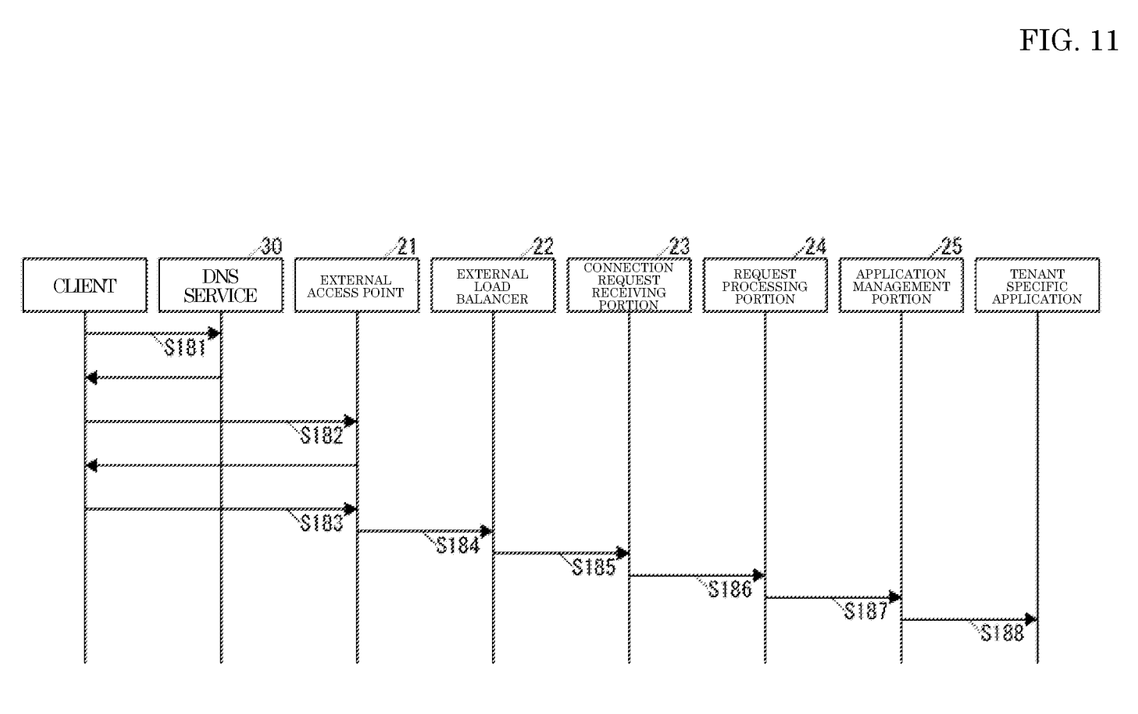
FIG. 11 is a sequence diagram showing an operation of the tenant management system shown in FIG. 2 when a user uses a tenant specific application.

FIG. 11 is a sequence diagram showing the operation of the tenant management system 20 when a user uses a tenant specific application.

When a user desires to use a tenant specific application, the user instructs a computer (not shown: hereinafter, referred to as a "client") to use the tenant specific application. The client is realized by a computer such as a PC.

In the following description, suppose that a service name, namely, the name of the solution 12, is "service.com". In addition, the domain name of the external access point 21 is supposed to be "cloud.app". Furthermore, the subdomain of a tenant (hereinafter, referred to as a "target tenant" in the description of the operation shown in FIG. 11) that realizes the tenant specific application (hereinafter, referred to as a "target tenant specific application" in the description of the operation shown in FIG. 11) that the user desires to use, is supposed to be "aapl".

As shown in FIG. 11, when instructed to use the tenant specific application, the client sends, to the DNS service 30, a query including "aapl.service.com" that is the FQDN of the server name of the target tenant (S181). Here, in the DNS service 30, a wild card including the external access point 21, namely, "*.cloud" has been registered as a server name. For example, when the subdomain is "xx", upon receiving a query including "xx.service.com", the DNS service 30 responds with "xx.cloud.app". As a result, in response to the query including "aapl.service.com", the DNS service 30 responds with "aapl.cloud.app".

After the process of S181, upon receiving, as a response, a server name of the target tenant from the DNS service 30, the client connects with the external access point 21 by using the received server name (in this case, "aapl.cloud.app") (S182).

After the process of S182, upon being connected with the external access point 21, the client transmits an HTTP/HTTPS connection request to the external access point 21 (S183).

Upon receiving the HTTP/HTTPS connection request that was transmitted from the client in S183, the external access point 21 transfers the received HTTP/HTTPS connection request to the external load balancer 22 (S184).

Upon receiving the HTTP/HTTPS connection request that was transferred from the external access point 21 in S184, the external load balancer 22 establishes an HTTP/HTTPS connection with the client, and transfers the connection request received from the external access point 21 to the connection request receiving portion 23 (S185). It is noted that for an HTTPS connection, the external load balancer 22 terminates the SSL (Secure Sockets Layer).

Upon receiving the connection request that was transferred from the external load balancer 22 in S185, the connection request receiving portion 23 transfers the request received from the external access point 21 to the request processing portion 24 (S186).

Upon receiving the request that was transferred from the connection request receiving portion 23 in S186, the request processing portion 24 processes an authentication request with the client based on a combination of a user ID and a password included in the request received from the connection request receiving portion 23, acquires a subdomain included in the request received from the connection request receiving portion 23, and calls the application management portion 25 (S187). Here, in the request received from the connection request receiving portion 23, for example, a subdomain is shown in "Host" of HTTP request headers.

Upon being called by the request processing portion 24 in S187, the application management portion 25 calls, among tenant specific applications that are, in the management table 29a, associated with the subdomain acquired by the request processing portion 24 and a user ID of a user who was successfully authenticated by the request processing portion 24, a tenant specific application that is specified in the request from the client (S188). This allows the tenant specific application specified in the request from the client to execute an operation corresponding to the request from the client.

In a conventional tenant management system, when users of a tenant specific application increase, the resource of a web server that realizes the tenant specific application may become insufficient, and the tenant specific application may not operate appropriately.

On the other hand, the tenant management system 20 according to the embodiment of the present disclosure is configured to improve the possibility that the tenant specific application operates appropriately.

Specifically, as described above, when a value that is obtained by multiplying the number of users who are registered in association with a particular tenant specific application for a particular tenant, by a consumption resource unit of the tenant specific application, has exceeded a current amount of resource of the tenant specific application for the tenant (YES at S164), the tenant management system 20 additionally provisions a particular amount of resource of the tenant specific application for the tenant (S165). Accordingly, when resource is insufficient, it is possible to automatically provision additional resource. As a result, it is possible to improve the possibility that the tenant specific application operates appropriately.

Upon receiving, from a user, a query including the FQDN of a server name of a tenant (S181), the tenant management system 20 calls a tenant specific application that is associated with a tenant that is identified by a subdomain in the FQDN (S188). This facilitates the user to specify a tenant.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A tenant management system comprising:
one or more web servers configured to:
terminate a request from a user at a tenant specific application that is an application prepared for a tenant in a solution that is built on a public cloud; and
provision resource of the one or more web servers that realize the tenant specific application, wherein
when a value that is obtained by multiplying a number of users who are registered in association with a particular tenant specific application for a particular tenant, by an amount of resource that is assumed to be consumed when one user uses the particular tenant specific application, has exceeded a current amount of resource of the particular tenant specific application for the particular tenant, the one or more web servers additionally provision a particular amount of resource of the particular tenant specific application for the particular tenant, and
the amount of resource that is assumed to be consumed when one user uses the particular tenant specific application is a mean value of use rates of a CPU, a memory, a storage, and a network band of a virtual machine measured when one user uses the particular tenant specific application.

2. The tenant management system according to claim 1, wherein
the one or more web servers are further configured to manage a subdomain as identification information of the tenant, and
upon receiving, from the user, a query including a fully qualified domain name (FQDN) of a server name of the tenant, the one or more web servers call the tenant specific application for the tenant that is identified by the subdomain in the FQDN.

\* \* \* \* \*